Figure 1:
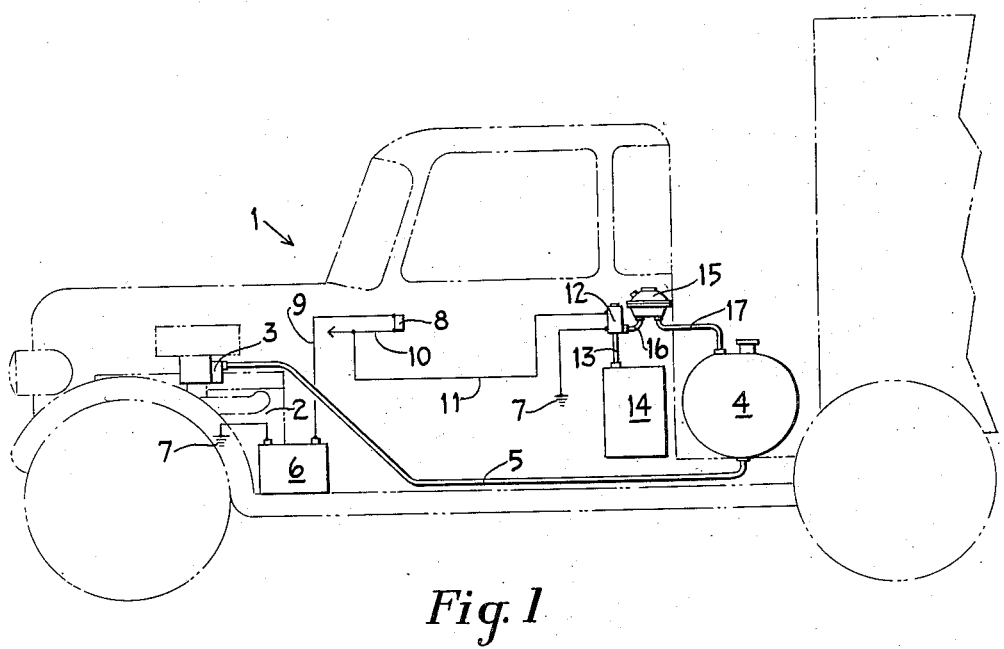

June 23, 1959     E. C. HORTON     2,891,606
FUEL FEED FOR AUTOMOTIVE VEHICLES
Filed April 8, 1954

INVENTOR.
Erwin C. Horton
BY Bean, Brooks, Buckley & Bean
Attys.

United States Patent Office 2,891,606
Patented June 23, 1959

2,891,606

FUEL FEED FOR AUTOMOTIVE VEHICLES

Erwin C. Horton, Hamburg, N.Y., assignor to Trico Products Corporation, Buffalo, N.Y.

Application April 8, 1954, Serial No. 421,743

2 Claims. (Cl. 158—36.5)

This invention relates to a system for feeding fuel to the engine of an automotive vehicle, and more particularly to a system utilizing pneumatic pressure for the purpose; the primary object of the invention being to provide a system of this character which is practical and efficient in operation and which employs superatmospheric air for feeding the fuel.

An additional object of the invention is to provide a fuel feeding system which is brought into operation immediately upon closure of the ignition switch.

A further object of the invention is to provided a fuel system in which superatmospheric pressure is utilized for compelling fuel to flow from the tank to the carburetor while providing a factor of safety against the hazard of fire when the vehicle is parked.

A greater appreciation of the invention and its objects will manifest itself as the description proceeds.

Figure 2:
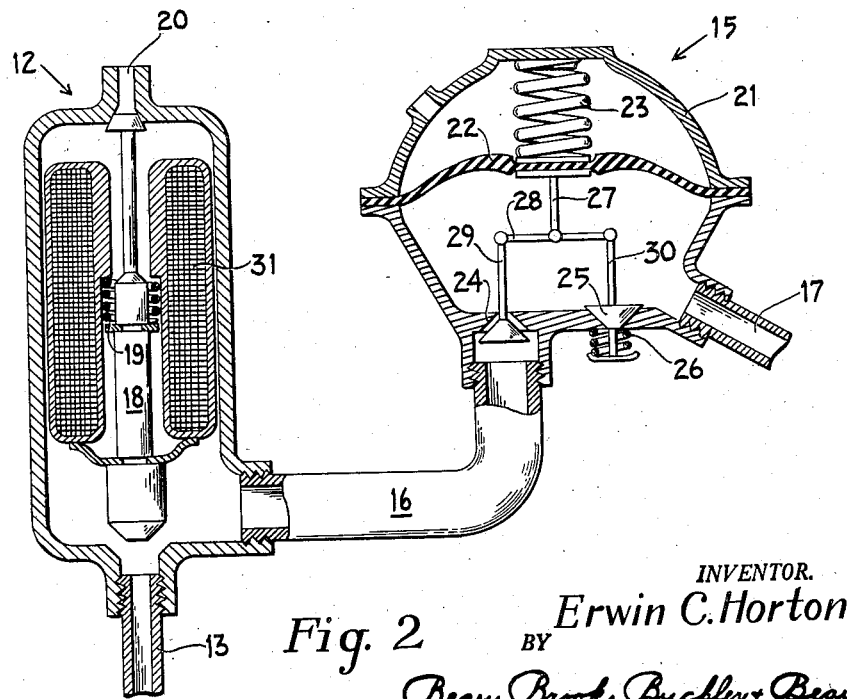

In the drawings:

Fig. 1 is a diagrammatic representation of an automotive vehicle equipped with a fuel feeding system constructed in accordance with the present invention; and, Fig. 2 is a sectional view of the venting and flow valves employed in the instant system.

Referring now more particularly to the drawing, the numeral 1 generally designates an automotive vehicle having an engine 2 with a carburetor 3 to which airtight fuel tank 4 is connected through conduit 5.

6 designates a battery grounded at 7 and connected to the ignition switch 8 by means of wire 9. Wire 10 leads in the usual manner from the switch to the conventional automotive electrical system, while lead 11 tapped off wire 10 is connected to a solenoid operated venting valve 12 which is grounded at 7.

Conduit 13 leads from pressure tank 14, or any other convenient source of superatmosphere air, to the venting valve which is in turn connected to pressure responsive flow valve 15 by means of conduit 16. Conduit 17 intercommunicates the flow valve and fuel tank 4.

Referring now more particularly to Fig. 2, armature 18 of the venting valve is normally held seated by compression spring 19 so as to close off conduit 13 and pressure tank 14 while opening atmospheric vent 20. Closure of the ignition switch results in the activation of solenoid coil 31 which raises the armature against the resistance of spring 19, permitting air to flow from the pressure tank to valve 15 via conduit 16. Concurrently, the atmospheric vent 20 is seated by the upper conical portion of the armature.

The flow valve comprises a substantially spherical pressure chamber 21 bisected by a flexible diaphragm 22 which is urged downward by spring 23 so as to normally maintain the inlet port 24 open and the blow-off valve 25 seated. Spring 26 supplements the action of spring 23 in maintaining the blow-off positively shut during normal operation.

A unique articulated transmission having a shifting pivot action is provided in the flow valve so as to obtain a rapid and sequential operation of the inlet and blow-off valves. As may be seen from Fig. 2, vertical stem 27 is firmly attached to the diaphragm and pivotally connected to substantially the mid-point of lever 28 while valve stems 29 and 30 of the inlet and blow-off valves respectively are pivotally connected to the extremities of the lever.

With blow-off valve 25 held firmly seated by spring 26, lever 28 will tend to rotate about its juncture with stem 30 so that the inlet valve will move at twice the rate of the diaphragm. If because of some fortuitous event the pressure in the lower portion of chamber 21 builds up to an excessive magnitude, diaphragm 22 will move upward against the resistance of spring 23 so as to cause the inlet valve to close. With the inlet valve firmly seated, the fulcrum shifts to the juncture of lever 28 and stem 29 so that further upward movement of the diaphragm will result in the opening of the blow-off against the resistance of spring 26.

As was stated above, when the ignition switch is closed the solenoid will draw armature 18 upward so as to close atmospheric vent 20 and open pressure tank 14. Superatmospheric air then flows from the pressure tank to the fuel tank raising the internal pressure of the latter so as to force fuel into the carburetor. In the event that the pressure reaches too high a magnitude, diaphragm 22 moves upward against the resistance of spring 23 so as to close the intake valve 24. When the pressure again drops to the desired level, the diaphragm returns to its normal position and opens the inlet valve. However, if the pressure continues to increase, the diaphragm rises still further, causing the blow-off valve to open and positively relieve the pressure, after which the diaphragm and valving returns to their normal operating positions.

When the vehicle is parked and the ignition switch opened, coil 31 is deactivated, permitting armature 18 to move downward under the urging of spring 19 so as to close off the pressure tank and open atmospheric vent 20. The compressed air in the fuel tank is thus permitted to bleed off and return the pressure in the fuel tank to atmospheric level in order to avoid the fire hazard of fuel leakage from a flooding float valve. However, the bleed is highly restricted so as to require several minutes for the pressure to be fully dissipated. In this manner, pressure is still available for fuel feed in the event the vehicle is to be parked for only a short time, avoiding the necessity of excessively depleting the supply in tank 14.

From the foregoing it will be observed that the instant system is safe, practical, and efficient. Fuel is available to the engine immediately upon closure of the ignition switch without any accompanying danger of fire due to the leakage of fuel when the vehicle is parked. Additionally, the unique valving employed in the system prevents the accumulations of excessive pressure while keeping the depletion of superatmospheric air to an absolute minimum.

Having thus disclosed an exemplary embodiment thereof, what I claim as my invention is:

1. In an automotive vehicle having a power plant, a fuel feeding system comprising in combination with an airtight fuel tank, a fuel line leading from said tank to said power plant, a source of superatmospheric pressure connected to said fuel tank for forcing fuel from said tank to said power plant, a pressure responsive valve interposed between said source and said tank, said valve having inlet valve means and blow-off valve means, means biasing said inlet valve means to open position and said blow-off valve means to closed position, movable wall means responsive to the pressure within said tank, articulated transmission means interconnecting said wall means and said inlet and blow-off valve means, said articulated transmission means having a motion multiplying action for sequentially closing said inlet valve means and opening said blow-off valve means when the pressure in said tank rises above a predetermined magnitude, an ignition switch for said power plant, and means responsive to the opening of said switch for substantially simultaneously closing off said source and venting said tank to the atmosphere.

2. In an automotive vehicle having a power plant, a fuel feeding system comprising in combination with an airtight fuel tank, a fuel line leading from said tank to said power plant, a source of superatmospheric pressure connected to said fuel tank for forcing fuel from said tank to said power plant, a pressure responsive valve interposed between said source and said tank, said valve having inlet valve means and blow-off valve means, means biasing said inlet valve means to open position and said blow-off valve means to closed position, and means for closing said inlet valve means when the pressure in said tank reaches a predetermined magnitude and for opening said blow-off valve means when the pressure in said tank reaches a predetermined magnitude above said first mentioned magnitude, said last-named means comprising, movable wall means responsive to the pressure in said tank, lever means pivotally connected intermediate its ends to said wall means, means pivotally connecting said inlet valve means to said lever means adjacent one end thereof, and means pivotally connecting said blow-off valve means to said lever means adjacent the opposite end thereof, whereby as said wall means moves in response to tank pressure said lever means pivots about said opposite end to close said inlet valve means and then about said one end to open said blow-off valve means, thereby providing a motion-multiplying action.

References Cited in the file of this patent

UNITED STATES PATENTS

| 1,471,417 | Rateau | Oct. 23, 1923 |
| 1,480,297 | Parker | Jan. 8, 1924 |
| 2,047,319 | Exley et al. | July 14, 1936 |
| 2,365,644 | Matje | Dec. 19, 1944 |
| 2,601,757 | Horton | July 1, 1952 |
| 2,630,249 | Bryant et al. | Mar. 3, 1953 |

FOREIGN PATENTS

| 685,565 | Great Britain | Jan. 7, 1953 |
| 359,788 | Germany | Nov. 24, 1921 |